US 6,715,004 B1

(12) United States Patent
Grimsrud et al.

(10) Patent No.: US 6,715,004 B1
(45) Date of Patent: *Mar. 30, 2004

(54) METHOD AND APPARATUS FOR INTERMEDIATE VALIDATION OF DATA TRANSFERRED BETWEEN A HOST AND A DEVICE

(75) Inventors: Knut S. Grimsrud, Forest Grove, OR (US); Gregory M. Pomerantz, New City, NY (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/538,356

(22) Filed: Mar. 29, 2000

(51) Int. Cl.7 .............................................. G06F 13/28
(52) U.S. Cl. .............................. 710/35; 710/22; 710/34; 710/33; 710/48; 714/805; 714/763; 714/48
(58) Field of Search ................................ 710/22, 46–48, 710/72–74, 33–35; 709/212; 714/763–768, 48, 805

(56) References Cited

U.S. PATENT DOCUMENTS

| 5,758,188 | A | * | 5/1998 | Appelbaum et al. .......... 710/35 |
| 5,784,390 | A |   | 7/1998 | Masiewicz et al. |
| 5,928,372 | A |   | 7/1999 | Yoshida |
| 6,182,267 | B1 | * | 1/2001 | Kidd et al. .................. 714/807 |
| 6,275,242 | B1 | * | 8/2001 | Shah et al. .................. 345/533 |
| 6,567,953 | B1 | * | 5/2003 | Pomerantz .................. 714/805 |

* cited by examiner

Primary Examiner—Jeffrey Gaffin
Assistant Examiner—Mike Nguyen
(74) Attorney, Agent, or Firm—Blakely, Sokoloff, Taylor & Zafman LLP

(57) ABSTRACT

According to one aspect of the present invention, a method is provided in which a device, in response to a read request issued by a host, transfers data to the host through a series of direct memory access (DMA) data in bursts. The host is allowed to interrupt the data transfer and terminate the data in burst upon completion of a portion of the data transfer.

21 Claims, 7 Drawing Sheets

METHOD AND APPARATUS FOR INTERMEDIATE VALIDATION OF DATA TRANSFERRED BETWEEN A HOST AND A DEVICE

FIELD OF THE INVENTION

The present invention relates generally to the field of data transfer technology. More specifically, the present invention relates to an apparatus, method, and system for intermediate validation of data transferred between a storage device and a host.

BACKGROUND OF THE INVENTION

As computer devices and systems continue to advance and become more complex, effective and efficient techniques for transferring data between various components in computer systems have become more and more critical in system design and implementation. In particular, data transfer between an I/O device (e.g., a hard disk) and a host device (e.g., system memory) has been constantly examined and improved in order to improve the system's total performance and reliability. In the PC industry, the performance of the hard disk drive, which is the central I/O device of the PC, has become more and more important due to continual performance increases in the CPU, system memory and other various components of the PC.

The hard drive interface in a PC system provides the path for transferring data between a hard drive and system memory. The vast majority of PC systems today rely on the Advanced Technology Attachment (ATA), also referred to as the Integrated Drive Electronics (IDE), hard disk drive interface to transfer data between the hard disk and the system memory. The original ISA-dependent ATA/IDE interface was limited to a data transfer rate of about 4 Mbytes/sec to about 8 Mbytes/sec. Various data transfer protocols or standards have been developed to facilitate and control the various aspects of data transfer through an ATA/IDE interface. Data transfer protocols or standards such as the programmed input/output (PIO) and direct memory access (DMA) modes were developed to take advantage of the local bus architectures that replaced the original ISA bus. ATA interface modes have improved from PIO to DMA and now Ultra DMA, with data transfer rates up to 33.3 Mbytes/sec and 66.6 Mbytes/sec according to the Ultra ATA/33 and the Ultra ATA/66 protocols, respectively.

ATA-4 includes Ultra ATA/33 which uses both the rising and falling edges of the strobe signal as signal separators. Using both edges of the strobe signal effectively allows the available transition frequency to be doubled without increasing the frequency of the strobe, thus doubling the burst transfer rate. ATA-5 includes Ultra ATA/66 which doubles the Ultra ATA burst transfer rate by reducing setup times and increasing the strobe rate.

As mentioned before, DMA protocol allows a peripheral device (e.g., a hard drive) to directly transfer data to the system's memory with minimal involvement from the system processor. DMA increases transfer speed by using a DMA controller or DMA engine to manage the data transfer between the device and the system memory rather than the system processor. Ultra DMA is a data transfer protocol to be used with the READ DMA, WRITE DMA commands and data transfer for PACKET commands.

A disk read request (e.g., an Ultra DMA READ command) typically contains two portions: a demand portion and a pre-fetch portion. First, the demand portion of the request is retrieved from the disk. Second, additional contiguous pre-fetch data is transferred from the disk to the system memory in the background after the transfer of the demand portion is completed. Currently, the host has to wait until the entire data transfer including the pre-fetch data is completed before it can proceed to use the demand portion of the read request. System performance is not optimized due to the current method of pre-fetching because the host cannot proceed to use the demand portion of the data transfer until the entire transfer is completed although the transfer of the demand portion will have completed long before the entire transfer is completed. Since the pre-fetched data is speculative, in order to avoid incurring a performance penalty, the host should not have to await the completion of the pre-fetch data before it can proceed to use the demand-fetched data. In addition, as the pre-fetch length is long and the CPU power continues to increase, it is increasing likely that a request for subsequent data (i.e., a pre-fetch hit) will be submitted by the host while the pre-fetch transfer is still in progress. Since most transfer lengths initiated by the host are typically small, the transfer of subsequent requested data which is a pre-fetch hit would have been completed before the entire pre-fetch request is completed. The host should not have to wait for the entire transfer to complete before allowed to proceed with the portion of the data transfer which is pre-fetch hit. Similarly, when a request is issued which is not a pre-fetch hit, the host should not have to wait for the entire pre-fetch transfer to complete before it can abort the pre-fetch request in progress and proceed with servicing the new request.

SUMMARY OF THE INVENTION

According to one aspect of the present invention, a method is provided in which a device, in response to a read request issued by a host, transfers data to the host through a series of direct memory access (DMA) data in bursts. The host is allowed to interrupt the data transfer and terminate the data in burst upon completion of a portion of the data transfer.

BRIEF DESCRIPTION OF THE DRAWINGS

The features and advantages of the present invention will be more fully understood by reference to the accompanying drawings, in which.

DETAILED DESCRIPTION

Figure 1:
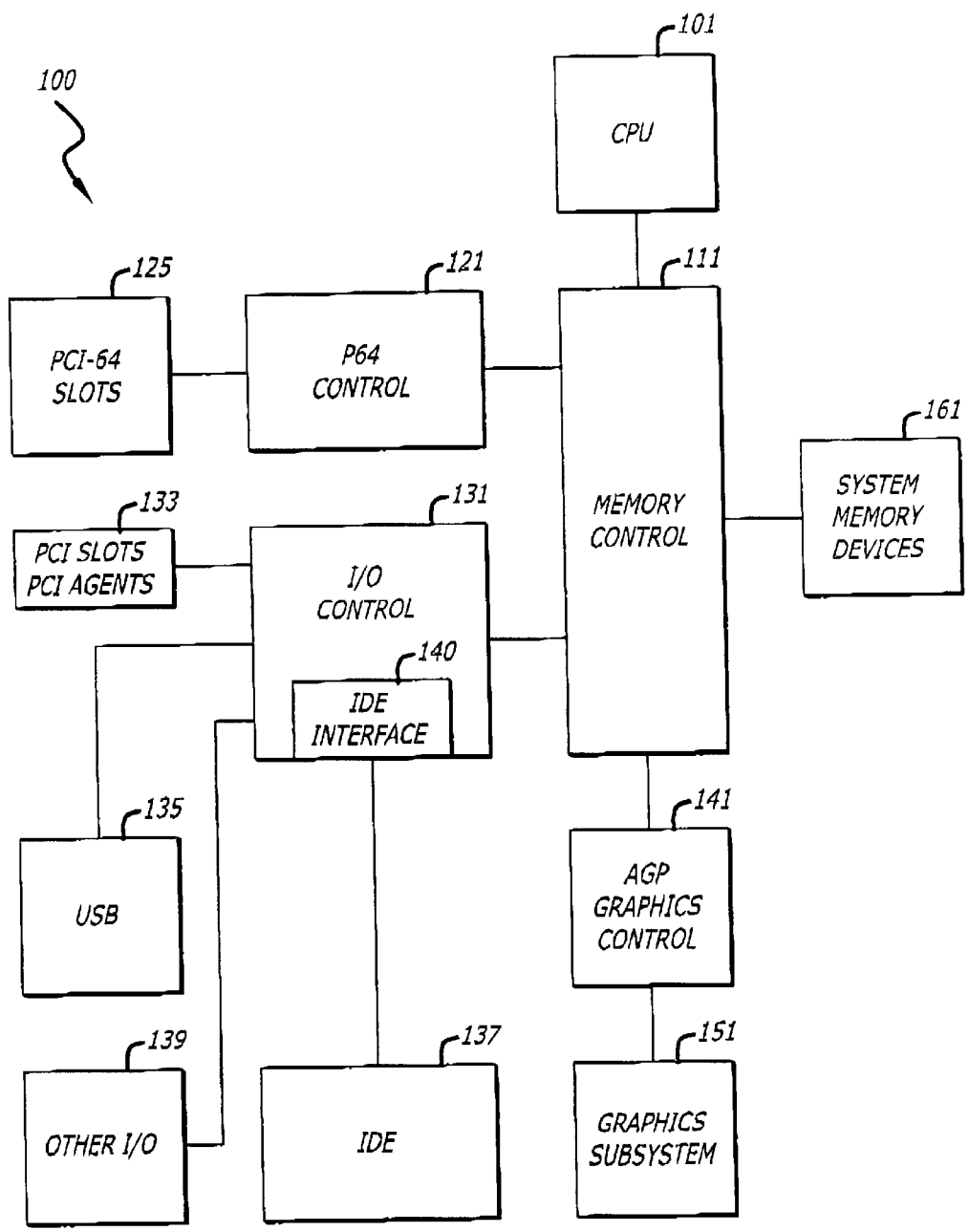
FIG. 1 is a block diagram of one embodiment of a system according to the teachings of the present invention.

In the following detailed description numerous specific details are set forth in order to provide a thorough understanding of the present invention. However, it will be obvious to one skilled in the art that the present invention may be understood and practiced without these specific details.

In the discussion below, the teachings of the present invention are utilized to implement a method, apparatus, and a system for intermediate validation of data transferred between a storage device and a host prior to the completion of the entire data transfer. In one embodiment, the storage device executes a DMA read command issued by the host to transfer a requested amount of data from the storage device to the host according to the Ultra DMA data transfer protocol. The requested amount of data, in one embodiment, contains a demand portion and a pre-fetch portion. The host, in one embodiment, interrupts the read command and terminates the data in burst upon completion of transfer of the demand portion. The host keeps track of the progress of the data transfer to determine when the transfer of the demand portion is completed. In one embodiment, in response to a determination by the host that the demand portion of the requested data has been completed, an interrupt signal is generated by the host to indicate that the demand portion has been transferred from the storage device. In response to the interrupt signal, the host initiates the termination of the data in burst. In one embodiment, to keep track of the progress of the data transfer, the host maintains a first list having a first set of entries that correspond to the demand portion of the data transfer. An interrupt bit is included in an entry in the list that corresponds to the end of the demand portion. In one embodiment, the interrupt bit is set in response to the completion of the entry which corresponds to the end of the demand portion. In one embodiment, an error code calculation is transmitted from the host to the storage device upon termination of the data in burst by the host. The demand portion of the data transfer is validated by the device based upon the error code calculation provided by the host upon termination of the data in burst. In one embodiment, the storage device validates the demand portion of the data transfer by comparing the error code calculation provided by the host with an error code calculated by the storage device with respect to the data in burst. In one embodiment, the error code is a 16-bit cyclic redundancy check (CRC) code. The host and the device, in accordance with the Ultra DMA data transfer protocol, calculate a CRC value for each data in burst. While the present invention is described herein with respect to the Ultra DMA data transfer protocol, it should be appreciated and understood by one skilled in the art that the teachings of the present invention are also applicable to any scheme, method and system for transferring data between a storage device and a host that are compatible with the ATA or Ultra ATA data transfer protocols or standards. Moreover, the teachings of the present invention are not limited to the ATA or Ultra ATA data transfer protocols and can also be applied to the data transfer between other various components of the system.

FIG. 1 shows a block diagram of one embodiment of a system configuration in which the teachings of the present invention are implemented. The system configuration 100 includes one or more central processing unit (CPU) 101, a memory control hub (also referred to as memory control unit or memory controller) 111, a P64 control unit 121, an Input/Output (IO) control unit 131, a graphics controller 141 coupled to a graphics subsystem 151, and a plurality of system memory devices 161. For the purposes of the present specification, the term "processor" or "CPU" refers to any machine that is capable of executing a sequence of instructions and shall be taken to include, but not be limited to, general purpose microprocessors, special purpose microprocessors, multi-media controllers and microcontrollers, etc. In one embodiment, the CPU 101 is a general-purpose microprocessor that is capable of executing an Intel Architecture instruction set. The CPU 101, the P64 control unit 121, the IO control unit 131, and the AGP graphics control unit 141 access the system memory devices 161 via the memory control unit 111. The memory control unit 111, in one embodiment, is responsible for servicing all memory transactions that target the system memory devices 161. The memory control unit 111 can be a stand-alone unit, an integrated part of a chipset, or a part of some larger unit that control the interfaces between various system components and the system memory devices 161. The P64 control unit 121 provides the interface control between a plurality of PCI-64 slots 125 and the memory control unit 111. The IO control unit 131 provides the interface control between the memory control unit 111 and various IO devices and ports including the PCI slots and PCI agents 133, a plurality of USB ports 135, a plurality of IDE devices 137, and other IO devices 139. The IO control unit 131, in one embodiment, contains an IDE host interface unit 140 that controls the interface between the IDE devices 137 and the memory control unit 111. The AGP graphics control unit 141 provides the interface control between the graphics subsystem 151 and the memory control unit 111. The IDE host interface unit 140 can be a stand-alone unit, an integrated part of a chipset, or a part of some larger unit that controls the interfaces between various IDE devices 137 and the system memory devices 161. The structure and functions of the IDE host interface unit 140 are described in greater detail below. For the purposes of the present specification, the IDE devices 137 are assumed to be Ultra ATA or Ultra DMA compatible, i.e., capable of transferring data to the host in accordance with the Ultra ATA and Ultra DMA data transfer protocol.

Figure 2:
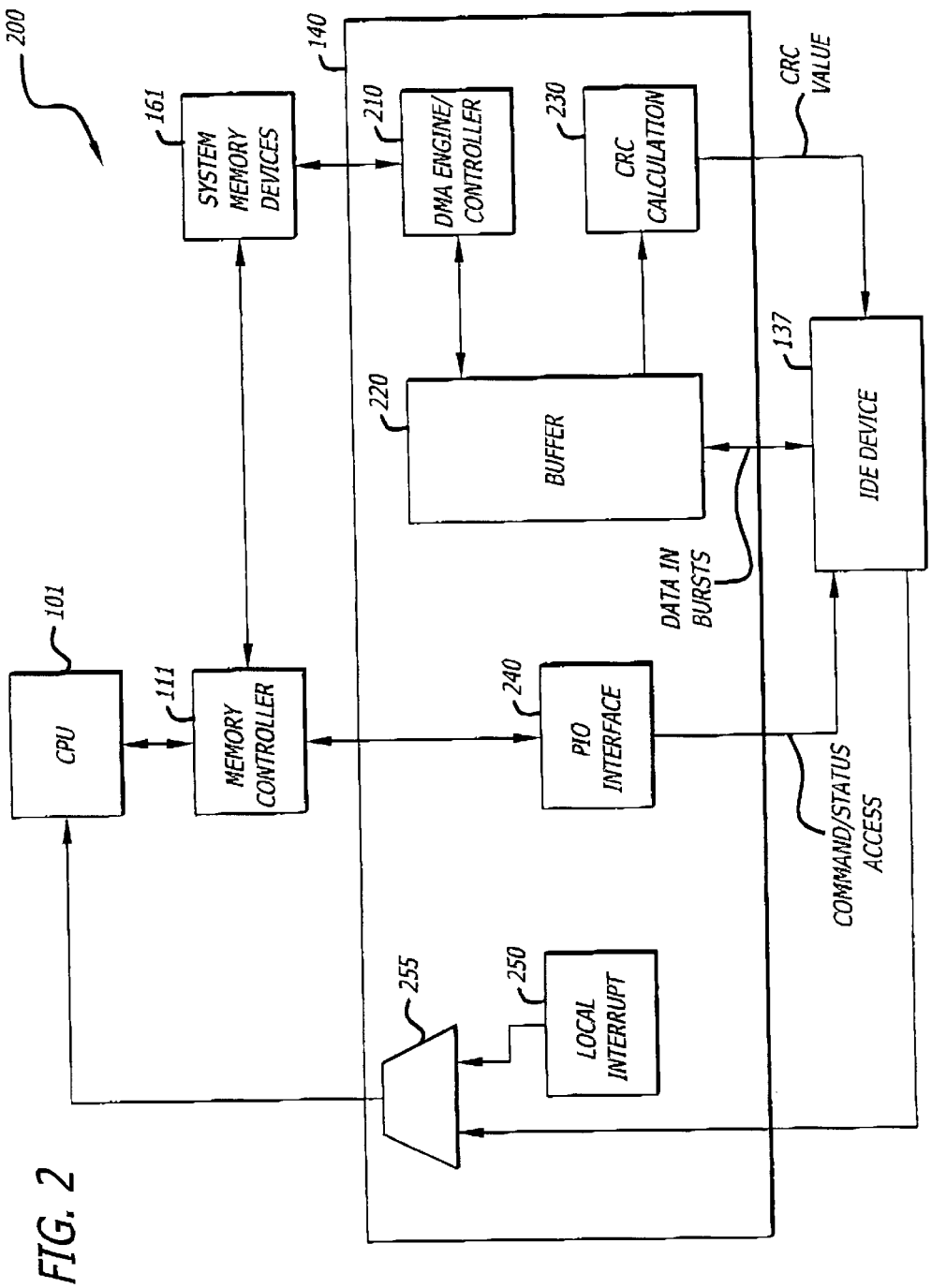
FIG. 2 shows a block diagram of one embodiment of an interface according to teachings of the present invention.

FIG. 2 shows a block diagram of one embodiment 200 of the IDE host interface unit 140 described in FIG. 1. In this embodiment, the IDE host interface unit 140 contains a DMA engine (also referred to as DMA controller) 210, a data buffer 220, CRC calculation logic 230, a PIO interface 240, and a local interrupt logic 250. In one embodiment, the DMA engine 210 is responsible for controlling and managing DMA data transfer between the system memory devices 161 and the various IDE devices 137 in accordance with the Ultra DMA data transfer protocol. In one embodiment, the DMA engine is configured to support both Ultra ATA/66 mode having a transfer rate of up to 66 Mbytes/sec and the Ultra ATA/33 mode having a transfer rate of up to 33 Mbytes/sec. The data buffer 220 is used for temporary storage of data transferred between the IDE devices 137 and the system memory devices 161. The CRC calculation logic 230 is used to provide data integrity information with respect to the data transferred by calculating a CRC value for each data burst. The PIO interface 240 provides the interface control with respect to the PIO data transfer mode. In this embodiment, the PIO interface is configured to support all existing PIO data transfer modes including PIO Mode 4 with a transfer rate up to 14 Mbytes/sec. In one embodiment, the read/write commands and status access commands issued by the host are transmitted to the IDE devices 137 via the PIO interface 240. The local interrupt logic 250, in one embodiment, is responsible for generating an interrupt signal to the host when certain criteria are satisfied (e.g., when a demand portion of the data transfer is completed and/or when the entire data transfer is completed). Traditionally, as mentioned above, the storage device such as the IDE devices 137 are responsible for signaling the host (e.g, the processor, the memory control unit 111, or the IDE host interface 140, etc.) via an interrupt when the host needs to provide the storage devices with a service (e.g., such as at the end of a data transfer). Local interrupt generation allows the interrupt to be generated locally on the host side at various phases during a data transfer. Local interrupt generation relies on the DMA engine 210 to generate a host interrupt during a DMA transfer by annotating the scatter/gather list for the transfer to include an interrupt bit. When enabled, the bit would signal the DMA engine 210 to generate an interrupt upon completion of a corresponding scatter/gather entry. In one embodiment, multiple entries in the scatter/gather list may be flagged with the interrupt bit so that the interrupt signal to the host can be generated at various points during a data transfer for various purposes (e.g., signaling the host after a demand portion of the data transfer has been successfully completed or signaling the host after the entire data transfer has been successfully completed). As explained and discussed herein, according to the teachings of the present invention, one efficient mechanism of pre-fetching is to create a scatter/gather list for the DMA engine to keep track of the data transfer progress where the first entries in the list point to the destination data buffer area for the demand portion and the subsequent entries point to pre-fetch data buffer area. A single disk transfer request can then be made by the host for the demand portion plus the pre-fetch portion. To avoid incurring the pre-fetch performance penalty, the local interrupt generation capability allows an interrupt to be generated at the end of the transfer of the demand portion, i.e., at the boundary between the demand data transfer and the speculative pre-fetch data transfer. By annotating the scatter/gather list, such an interrupt can be efficiently generated at the end of the demand portion, as well as at the end of the pre-fetch portion. The local interrupt capability included in the present embodiment of the invention can also be used to signal completion of a data transfer by the IDE host interface unit 140 rather than having the storage devices to maintain the transfer count information and determine the appropriate time to signal the host of a transfer completion the information and status of which the host side already controls. Accordingly, moving the pre-fetch function to the host side and implementing the local interrupt generation capability on the host side to generate interrupts at various points during a data transfer not only reduce the complexity and cost of the storage devices but also provide a very efficient and flexible mechanism for data pre-fetching. Allowing the interrupt signal to be generated locally as described herein allows the storage devices to interact with the host-side services at a finer granularity than merely at the completion of a transfer request.

Figure 3:
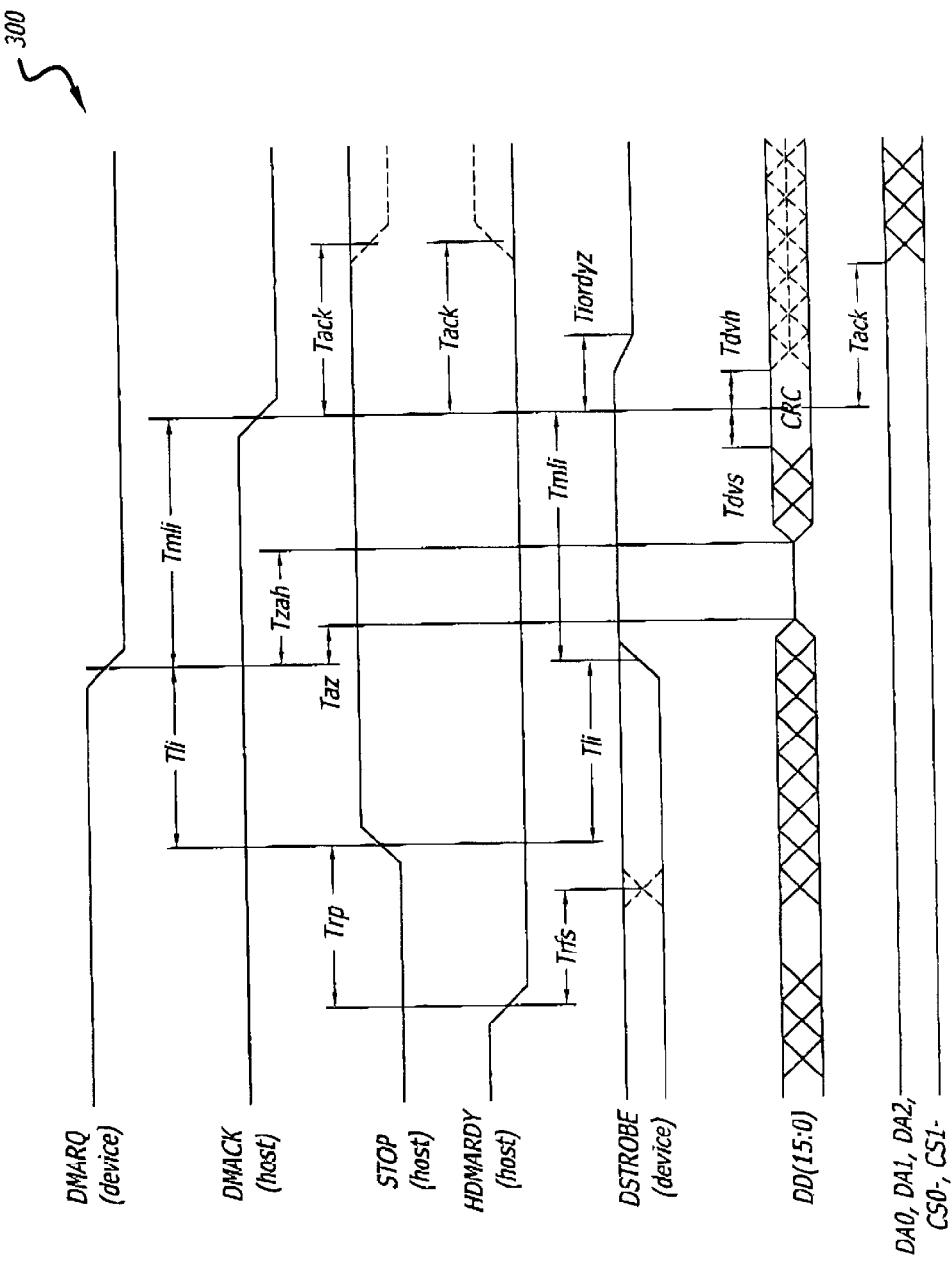
FIG. 3 illustrates a timing diagram of various data and control signals when a host terminates a data in burst according to the Ultra DMA data transfer protocol.

FIG. 3 shows an example of a timing diagram of various control and data signals illustrating various timing requirements when a host terminates a data in burst in accordance with Ultra DMA data transfer protocol. As shown in FIG. 3, various control signals include a DMA request signal (DMARQ) controlled by the IDE storage device, a DMA acknowledge signal (DMACK) controlled by the host, a STOP signal controlled by the host, a DMA ready signal (HDMARDY) controlled by the host, a data strobe signal (DSTROBE) controlled by the storage device. Also shown in FIG. 3 are the 16-bit data lines DD(15:0) that are driven either by the device or the host at various times during a data transfer depending upon the direction of the data transfer and the phase of the data transfer. A READ DMA or WRITE DMA command or data transfer for a PACKET command is accomplished through a series of Ultra DMA data in or data out bursts. Each burst has three phases of operation: the initiation phase, the data transfer phase, and the burst termination phase. The burst may be optionally paused during the data transfer phase. In the present discussion, an Ultra DMA burst is defined as the period from an assertion of the DMACK signal to the subsequent negation of DMACK. The burst initiation phase begins with the assertion of the DMARQ signal by the device and ends when the sender toggles the STROBE signal to transfer the first data word (i.e., the DSTROBE signal in the case of data in burst). The data transfer phase is in effect from after the burst initiation until the burst termination. Either agent (either the host or the device) may terminate a burst. This is not the same as command termination or completion. If the burst termination occurs before the command is complete, the command will be completed by initiation of a new burst (resumption of the data transfer) at some later time or aborted by the host issuing a reset to the device. There are four phases to the termination of the burst: (1) termination request, (2) termination acknowledged, (3) STROBE signal returned to asserted state, and (4) sending of CRC value on negation of DMACK.

Continuing with the present discussion, the burst termination should not be initiated by the host until at least one data word of the burst has been transferred. As shown in FIG. 3, the host initiates the burst termination by negating the HDMARDY signal. The device stops its toggling of DSTROBE signal within Trfs nanoseconds (ns) after the host negates HDMARDY signal. Trfs is defined as the read-to-final STROBE time (i.e., no more STROBE edges may be sent after Trfs after the HDMARDY signal is negated by the host). The host then asserts the STOP signal no sooner than Trp ns after negating HDMRDY. Trp is defined as the ready-to-pause time (i.e., the time until a receiver may assume that the sender has paused after negation of HDMARDY signal). According to the Ultra DMA/33 specification, the host will not negate STOP again until after the current data burst is terminated. The device will negate the DMARQ signal within Tli ns after the STOP signal has been asserted by the host. Tli is defined as the limited interlock time (i.e., time allowed between an action by one agent (either host or device) and the following action by the other agent). The device will not assert DMARQ again until after the current data burst is terminated. If DSTROBE is negated, the device will assert DSTROBE within Tli ns after STOP has been asserted by the host. No data will be transferred during this transition. The host will ignore this transition on DSTROBE. With continuing reference to FIG. 3, the device will release DD(15:0) no later than Taz ns after negating DMARQ. Taz is defined as the maximum time for outputs to release. The host will then drive DD(15:0) no sooner than Tzah ns after the device has negated DMARQ. Tzah is defined as the minimum delay time required for output drivers to turn on from released state. The host will then place the result of its CRC calculation on DD(15:0). The host will negate DMACK signal no sooner than Tmli ns after the device has asserted DSTROBE and negated DMARQ and the host has asserted STOP and negated HDMARDY, and no sooner than Tdvs ns after the host places the result of its CRC calculation on DD(15:0). Tmli is defined as the interlock time with minimum. Tdvs is defined as the data valid setup time. The device will then latch the host's CRC data from DD(15:0) on the negating edge of DMACK. The CRC data provided by the host will be compared with the CRC data calculated by the device to determine whether the transfer of the data burst is successful. If the CRC value calculated by the host and the CRC value calculated by the device do not match, the device will keep track of this error condition for reporting at the end of the command.

Figure 4:
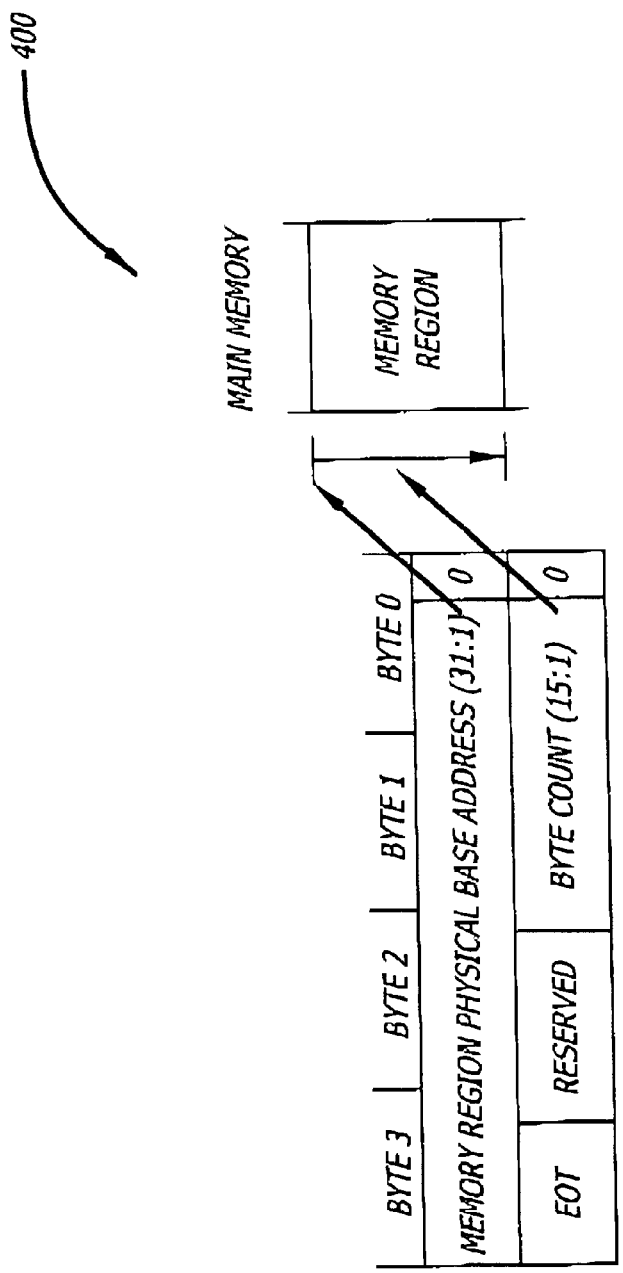
FIG. 4 shows an example of a physical region descriptor (PRD) table according to one embodiment of the present invention.

FIG. 4 illustrates a physical region descriptor (PRD) table (also referred herein as the scatter/gather list) that contains one or more PRD entries (PRDs). In one embodiment, the data transferred between the host and the device are grouped into one or more physical memory regions. Each physical memory region to be transferred between the host and the device is described by a PRD. The PRDs are stored sequentially in the PRD table (the scatter/gather list). Normally, the data transfer proceeds until all regions described by the PRDs in the table have been transferred or completed. However, as described herein, to implement an efficient pre-fetching mechanism according to the teachings of the present invention, the PRD table will be annotated so that the host side DMA engine can generate an interrupt and terminate a data in burst upon the completion of a particular PRD entry (i.e., at the completion of the transfer of a particular physical memory region).

In one embodiment, the PRD table is aligned on 64-Kbyte boundaries. Each PRD entry in the table is 8 bytes in length. The first 4 bytes in a PRD entry specify the byte address of a physical memory region. In one embodiment, this memory region is DWord aligned and does not cross a 64-Kbyte boundary. The next 2 bytes in the PRD entry specify the size or transfer count of the region in bytes. In one embodiment, the size of transfer count is 64-Kbyte limit per region. A value of 0 in these 2 bytes indicates 64 Kbytes (thus the minimum transfer count is 2 bytes). If bit 7 (EOT) of the last byte is a 1, it indicates that this is the final PRD in the Descriptor table. In one embodiment, the total sum of the byte counts in every PRD of the descriptor table is equal to or greater than the size of the disk transfer request. The DMA controller transfers data to or from system memory responding to the DMA requests from the IDE device. When the last data transfer for a memory region has been completed on the IDE interface, the next PRD is fetched from the table. The controller then begins transferring data to or from that PRD's memory region. Traditionally, the IDE device signals an interrupt once its programmed data count has been transferred. In one embodiment, in response to the interrupt, the system software or operating system resets the start/stop bit in the command register. It then reads the DMA controller status and then the IDE drive status to determine if the transfer completed successfully.

Conventionally, as described above, the IDE device is responsible for signaling the host via an interrupt when the host needs to provide the IDE device with a service request (e.g., at the end of a data transfer). However, according to the teaching of the present invention, local interrupt logic is implemented on the host side (i.e., within the IDE host interface unit) so that the host side can generate interrupts locally at various phases during a data transfer from the IDE device. In the present embodiment, the appropriate PRD entries in the PRD table are annotated by including an interrupt bit so that upon completion of the transfer of corresponding physical memory region, the interrupt bit is set to allow the host side to generate an interrupt signal at the appropriate points during the data transfer. Specifically, the PRD entry corresponding to the demand portion of a data transfer request may be flagged with the interrupt bit. When the transfer of the physical memory region corresponding to the demand portion is completed, the interrupt bit is enabled to signal the DMA controller to generate an interrupt. As such, the host side does not have to wait for the entire data transfer to be completed. It can proceed with the demand portion as soon as the transfer of the demand portion is completed as indicated by the interrupt bit included in the corresponding PRD entry for the demand portion. Similarly, the local interrupt generation mechanism described herein can also be used to signal the host at other points during a data transfer including the end of the entire data transfer. Accordingly, multiple PRD entries in the PRD table may be flagged with an interrupt bit so that a local interrupt can be generated at the completion of the corresponding PRD entries (i.e., when the transfer of the physical memory region described by the corresponding PRD entries is completed). By annotating the scatter/gather list and having the local interrupt capability, the host can monitor the progress of a data transfer from an IDE device and can take appropriate actions at various points during the data transfer. The host does not have to wait until the entire data transfer is completed before it can proceed to use the demand portion that has been successfully transferred from the IDE device. Likewise, when a request is issued which is not a pre-fetch hit, the host can abort the pre-fetch in progress and proceed with servicing the new request. As the pre-fetch is aborted, the portion of the pre-fetch data that has already been completed can be preserved as successfully loaded data rather than being discarded.

Figure 5:
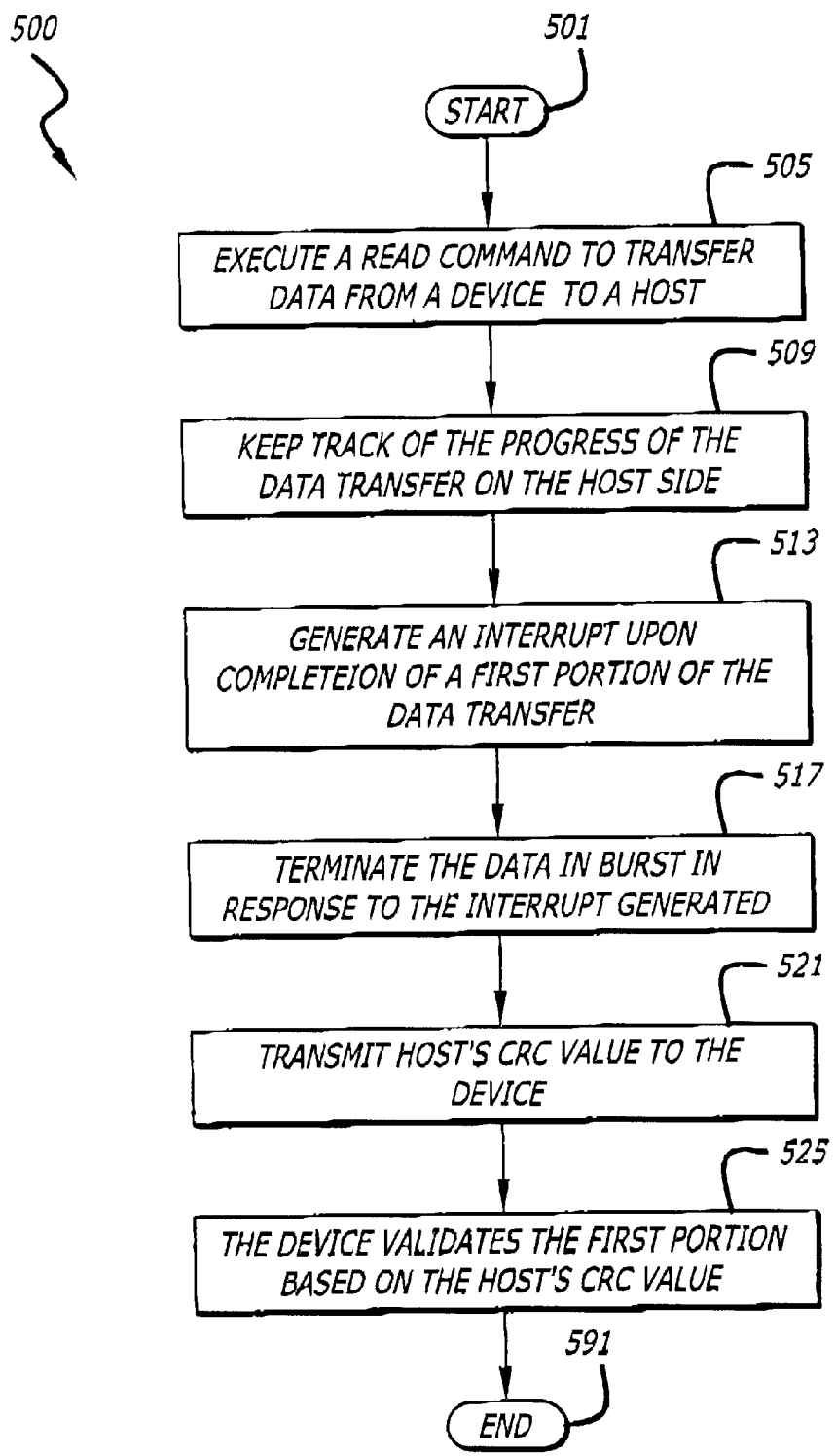
FIG. 5 is a flow diagram of one embodiment of a method for transferring data between a device and a host in accordance with teachings of the present invention.

FIG. 5 shows a flow diagram of one embodiment of a method 500 for transferring data from a storage device to a host. The method 500 starts at block 501 and proceeds to block 505. At block 505, in response to a read command issued by the host, the device executes the read command to transfer a requested amount of data to the host through a series of DMA data in bursts. Each data in burst includes an initiation phase, a data transfer phase, and a termination phase. At block 509, the host keeps track of the progress of the data transfer from the device. In one embodiment, as explained above, the host keeps track of the progress of the data transfer from the device using PRD table (the scatter/gather list) that is annotated to keep track of when the transfer of one or more particular physical memory regions is completed. As described above, the transfer status of one or more particular physical memory regions can be kept track of by including an interrupt bit in the corresponding PRDs in the PRD table. At block 513, an interrupt signal is generated by the host side upon the completion of a first portion of the data transfer. The first portion in this case can be the demand portion of the read request issued by the host. As described herein, the read request issued by the host can contain a demand portion and a pre-fetch portion. To improve the performance of the data transfer, the host should not have to wait until the entire data transfer is completed before proceeding with the demand portion which will have completed long before the completion of the pre-fetch portion. In one embodiment, the PRD corresponding to the demand portion of the read request is annotated with an interrupt bit. This interrupt bit will be enabled or activated when the transfer of the demand portion is completed. In response to the interrupt bit in the appropriate PRD being turned on, the host side generates an interrupt signal to indicate that the transfer of the demand portion has been completed. This method can also be used to generate interrupt at other points of the data transfer including the point at which the pre-fetch portion or the entire data transfer is completed. Continuing with present discussion, at block 517, the host side initiates the termination of the current data in burst in response to the interrupt signal. As explained above, terminating a data burst does not terminate the transfer but rather results in the transfer being suspended until it is resumed again. The burst can be terminated directly by the DMA engine in response to the interrupt generation. Alternatively, the burst can be terminated indirectly by the host's interrupt service routine generating an access command to access the device's task file registers (e.g., reading the status register) in response to the interrupt generation. In this case, the DMA burst will be terminated in response to the access command to allow access by the host to the device's task file registers. At block 521, the host side transmits its CRC value to the device upon the termination of the data in burst. The exchange of the control signals and the transmission of the CRC value during the termination phase of a data in burst initiated by the host is described above with respect to FIG. 3. At block 525, the device compares the host's CRC value with the device's CRC value to determine whether the transmission of the first portion was successful. If the host's CRC value does not match the device's CRC value, the device will set the appropriate error flag in its status register accordingly. This error condition will be maintained for the duration of the entire data transfer. In other words, the error flag bit in the status register, once set, will be handled as a "sticky" bit for the duration of the entire transfer. This mechanism allows the host side to obtain the intermediate data integrity status information from the device (e.g., the status of the demand portion of the transfer request).

Figure 6:
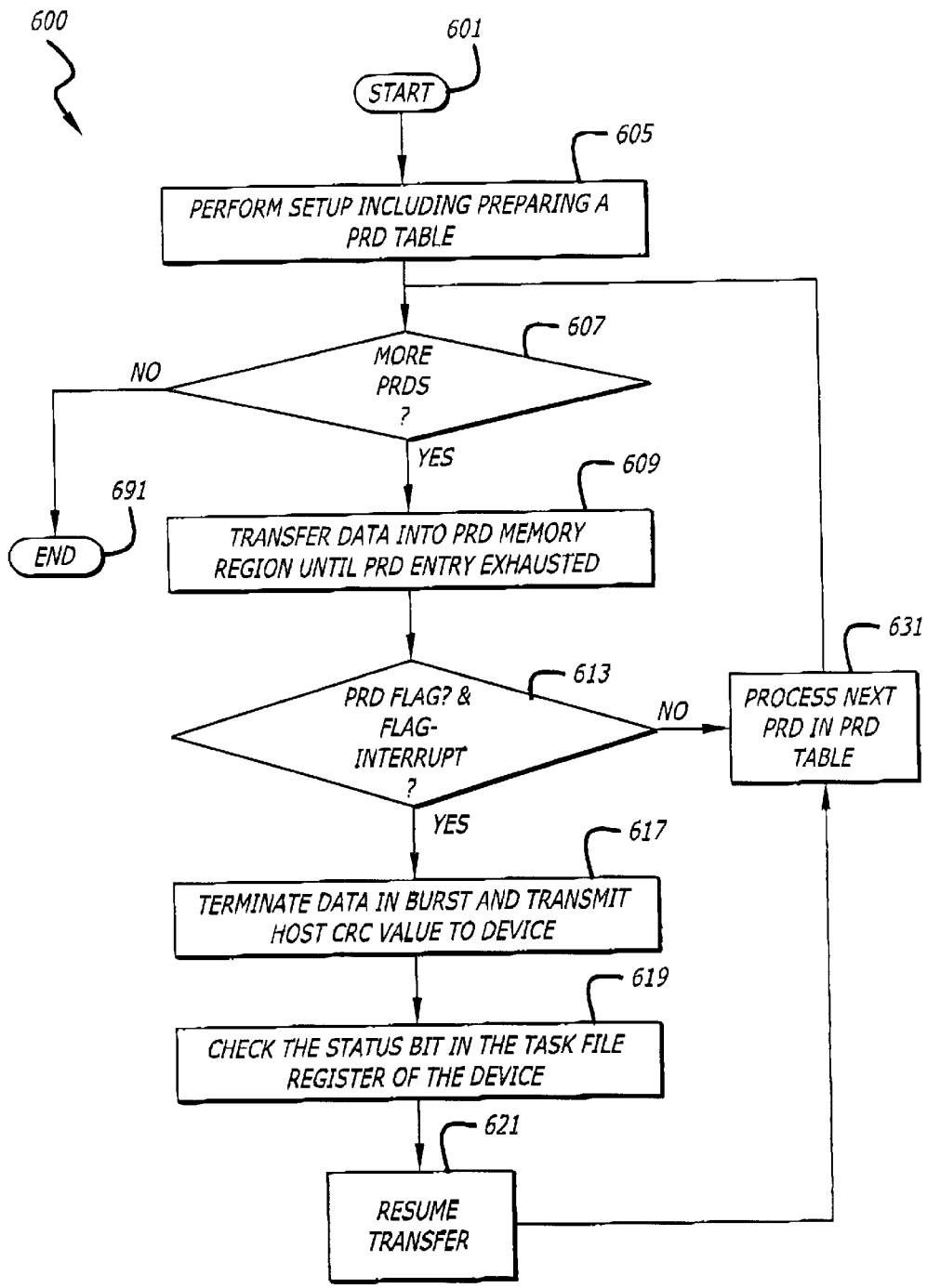
FIG. 6 is a flow diagram of one embodiment of a process performed by a DMA controller according to the teachings of the present invention.

FIG. 6 shows a flow diagram illustrating the operations of DMA engine on the host side according to one embodiment of the present invention. The process 600 starts at block 601 and proceeds to block 605 to perform setup and start receiving data transferred from the device. At block 607, the process continues if there are more PRD entries in the PRD table to process. Otherwise the process 600 proceeds to end at block 691. At block 609, the DMA engine continues to transfer data received from the device into the physical memory region described by the corresponding PRD until the corresponding PRD is exhausted. At block 613, if the corresponding PRD entry is flagged with the interrupt bit and the interrupt bit is activated in response to the completion of the corresponding physical memory region, then the process 600 proceeds to block 617. Otherwise the process 600 proceeds to block 631. At block 617, the current data in burst is terminated and the host's CRC value is transmitted to the device according to the Ultra DMA protocol. At block 619, the host reads the status bit in the task file register of the device to determine whether the host's CRC value matches the CRC calculated by the device for the data transferred so far during the current command. At block 621, the data transfer between the device and the host is resumed. At block 631, the next PRD in the PRD table is processed.

Figure 7:
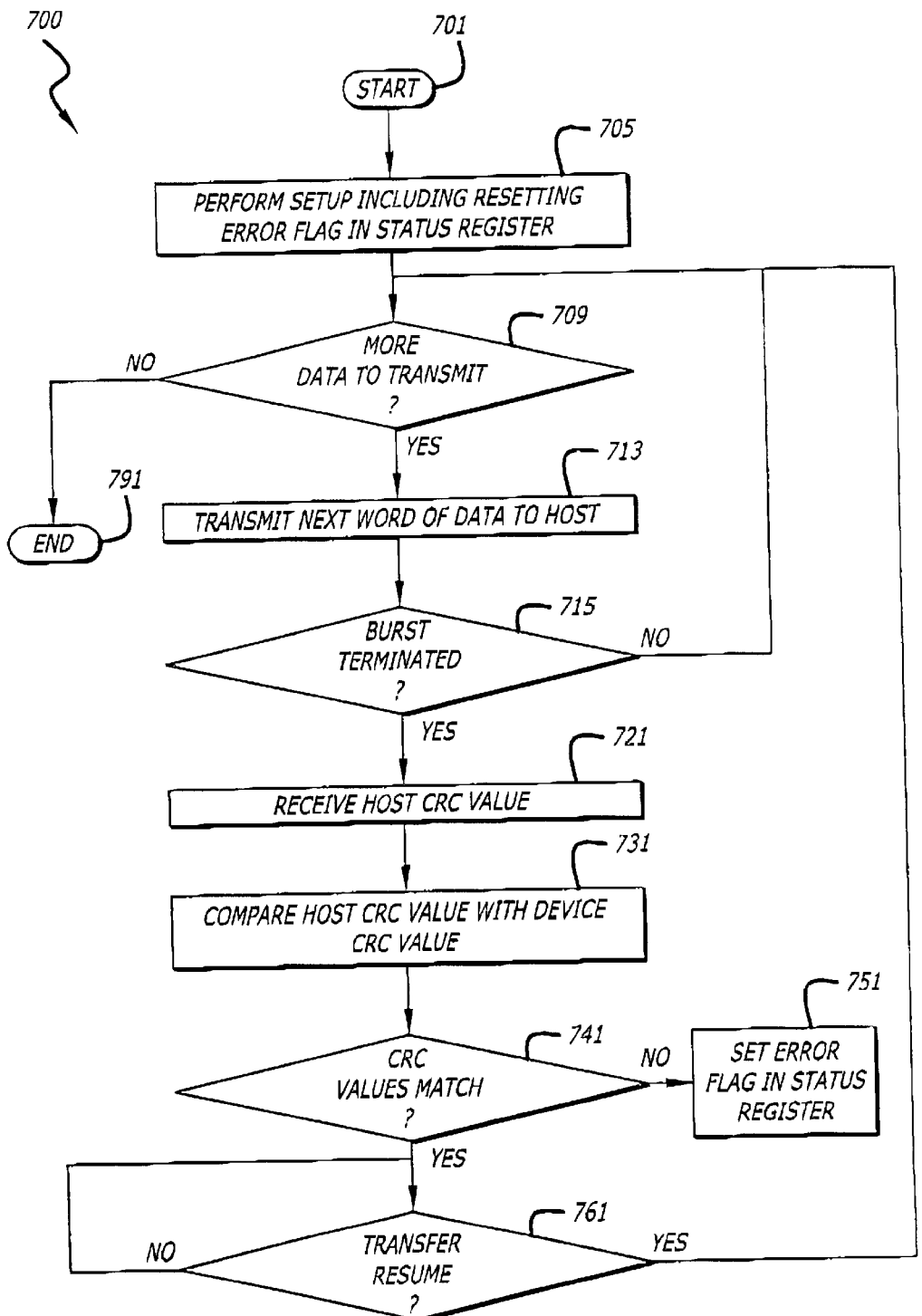
FIG. 7 is a flow diagram of one embodiment of a process performed by a device in accordance with the teachings of the present invention.

FIG. 7 is a flow diagram illustrating the operations on the device side according to the teachings of the present invention. The process 700 starts at block 701 and proceeds to block 705 in response to a read command request issued by the host. At block 705, the device performs setup including resetting the error flag in the status register prior to transferring data to the host. At block 709, if there are more data to transmit to the host, the process 700 proceeds to block 713, otherwise it proceeds to end at block 791. At block 713, the device transmits the next word of data to the host. At block 715, the device proceeds to block 721 if the current data in burst is being terminated by the host. Otherwise the process 700 loops back to block 709 to continue transmitting data to the host. At block 721, the device receives the CRC value from the host during the termination phase of the current data in burst. At block 731, the device compares the CRC value from the host with the CRC value calculated from the device. At block 741, if the CRC values do not match, the device proceeds to block 751 to set the error flag in the status register. At block 761, the device waits for the transfer to resume.

The invention has been described in conjunction with the preferred embodiment. It is evident that numerous alternatives, modifications, variations and uses will be apparent to those skilled in the art in light of the foregoing description.

What is claimed is:

1. A method performed by a host for validating a partial data transfer with a storage device, the method comprising:
   initiating a first data burst by the storage device to perform a direct-memory-access (DMA) data transfer request through an Integrated Drive Electronics (IDE) host Interface unit;
   configuring the IDE host interface unit to generate an interrupt signal to the host when the partial data transfer is completed;
   initiating a termination of the first data burst by the storage device in response to the interrupt signal; and
   querying the storage device to verify whether the partial data transfer has been transferred correctly.

2. The method of claim 1 further comprising initiating a second data burst by the storage device to complete the DMA data transfer request.

3. The method of claim 1 wherein configuring the IDE host Interface unit comprises:
   creating a list having a set of entries corresponding to the partial data transfer portion of the data transfer; and
   annotating an entry in the list with an interrupt bit, the entry corresponding to the end of the partial data transfer portion, the interrupt bit causing the IDE host interface unit to generate the interrupt signal upon completion of the entry.

4. The method of claim 3 wherein the list is a physical region descriptor (PRD) table and each of the entries is a PRD entry.

5. The method of claim 1 wherein querying the storage device comprises:
   calculating a host error code for the partial data transfer portion;
   transmitting the host error code to the storage device; and
   receiving a result of a comparison between the host error code and a device error code calculated by the storage device for the partial data transfer.

6. The method of claim 5 wherein the error code is a cyclic redundancy check (CRC) code.

7. The method of claim 6 wherein the CRC code is a 16-bit CRC code.

8. An Integrated Drive Electronics (IDE) host interface unit comprising:
   logic to issue commands to a storage device to instruct the storage device to transfer data through a series of direct-mnemory-access (DMA) data bursts;
   logic to generate an interrupt signal upon completion of a demand portion of the data transfer;
   logic to terminate a current data burst in response to the interrupt signal; and
   logic to query the storage device to verify whether the demand portion of the data transfer has been transferred correctly.

9. The IDE host interface unit of claim 8 further comprising logic to issue commands to a storage device to instruct the storage device to complete the DMA data transfer request through an additional DMA data burst.

10. The IDE host interface unit of claim 8 wherein logic to generate an interrupt signal comprises:

logic to maintain a list having a set of entries corresponding to the demand portion of the data transfer; and logic to annotate an entry in the list with an interrupt bit, the entry corresponding to the end of the demand portion, the interrupt bit causing the IDE host interface unit to generate the interrupt signal upon completion of the entry.

11. The IDE host Interface unit of claim 10 wherein the list is a physical region descriptor (PRD) table and each of the entries is a PRD entry.

12. The IDE host interface unit of claim 8 wherein logic to query the storage device comprises:

logic to calculate a host error code for the demand portion;

logic to transmit the host error code to the storage device; and logic to receive a result of a comparison between the host error code and a device error code calculated by the storage device for the demand portion.

13. The IDE host interface unit of claim 12 wherein the error code is a cyclic redundancy check (CRC) code.

14. The IDE host Interface unit of claim 13 wherein the CRC code is a 16-bit CRC code.

15. The IDE host interface unit of claim 8 wherein logic to query the storage device reads an error flag set by the storage device if the error code calculation provided by the interface does not match the error code calculated by the storage device.

16. The IDE host interface unit of claim 15 wherein the error flag once set by the storage device remains unchanged for a remainder of the data transfer.

17. A system comprising:

a storage device;

an Integrated Drive Electronics (IDE) host interface unit coupled to the storage device; and a host coupled to the IDE host interface unit, the host to initiate a first data burst by the storage device to perform a direct-memory-access (DMA) data transfer request through an Integrated Drive Electronics (IDE) host interface unit, to configure the IDE host interface unit to generate an interrupt signal to the host when the partial data transfer is completed, to initiate a termination of the first data burst by the storage device in response to the interrupt signal, and to query the storage device to verify whether the partial data transfer has been transferred correctly.

18. The system of claim 17 wherein the host is further to initiate a second data burst by the storage device to complete the DMA data transfer request.

19. The system of claim 17 wherein the host is to configure the IDE host interface unit by:

creating a list having a set of entries corresponding to the partial data transfer portion of the data transfer; and annotating an entry in the list with an interrupt bit, the entry corresponding to the end of the partial data transfer portion, the interrupt bit causing the IDE host interface unit to generate the interrupt signal upon completion of the entry.

20. The system of claim 19 wherein the list is a physical region descriptor (PRD) table and each of the entries is a PRD entry.

21. The system of claim 17 wherein the host is to query the storage device by:

calculating a host error code for the partial data transfer portion;

transmitting the host error code to the storage device; and receiving a result of a comparison between the host error code and a device error code calculated by the storage device for the partial data transfer.

* * * * *

UNITED STATES PATENT AND TRADEMARK OFFICE
CERTIFICATE OF CORRECTION

PATENT NO. : 6,715,004 B1
DATED : March 30, 2004
INVENTOR(S) : Grimsrud et al.

It is certified that error appears in the above-identified patent and that said Letters Patent is hereby corrected as shown below:

Column 10,
Line 56, delete "mnemory" and insert -- memory --.

Signed and Sealed this

Twenty-fourth Day of August, 2004

JON W. DUDAS
*Director of the United States Patent and Trademark Office*